United States Patent [19]
Hall et al.

[11] Patent Number: 5,835,166
[45] Date of Patent: Nov. 10, 1998

[54] CHIRAL NEMATIC LIQUID CRYSTAL POLARIZATION MODULATED COLOR DISPLAY FOR STEREOSCOPIC VIEWING DEVICE

[76] Inventors: Dennis R. Hall, 7075 SW. Hoodview Pl., Beaverton, Oreg. 97008; Philip A. Johnson, 7045 SW. 240th Pl., Beaverton, Oreg. 97007

[21] Appl. No.: 714,751

[22] Filed: Sep. 16, 1996

Related U.S. Application Data

[63] Continuation of Ser. No. 291,666, Aug. 17, 1994, abandoned.

[51] Int. Cl.[6] .................. G02F 1/1335; G02F 1/1347; C09K 19/02
[52] U.S. Cl. .................. 349/15; 349/74; 349/176
[58] Field of Search .................. 349/5, 6, 9, 74, 349/80, 96, 98, 115, 176, 15

[56] References Cited

U.S. PATENT DOCUMENTS

| | | | |
|---|---|---|---|
| 3,679,290 | 7/1972 | Adams et al. | 349/199 |
| 3,711,181 | 1/1973 | Adams et al. | 349/194 |
| 3,944,330 | 3/1976 | Tsunoda et al. | 349/152 |
| 4,021,846 | 5/1977 | Roese | 359/465 |
| 4,719,507 | 1/1988 | Bos | 359/465 |
| 4,726,663 | 2/1988 | Buzak | 349/80 |
| 4,917,465 | 4/1990 | Conner et al. | 349/5 |
| 4,966,441 | 10/1990 | Conner | 349/6 |
| 5,050,961 | 9/1991 | Venolia | 359/465 |
| 5,050,965 | 9/1991 | Conner et al. | 349/6 |
| 5,050,966 | 9/1991 | Berman | 349/194 |
| 5,082,354 | 1/1992 | Kalmanash | 349/115 |
| 5,122,887 | 6/1992 | Mathewson | 349/80 |
| 5,124,818 | 6/1992 | Conner et al. | 349/75 |
| 5,221,982 | 6/1993 | Faris | 349/115 |
| 5,295,009 | 3/1994 | Barnik et al. | 349/115 |
| 5,308,535 | 5/1994 | Scheuble et al. | 349/75 |
| 5,325,218 | 6/1994 | Willett et al. | 349/74 |
| 5,398,131 | 3/1995 | Hall et al. | 359/465 |

FOREIGN PATENT DOCUMENTS

| | | |
|---|---|---|
| 0 634 674 | 1/1995 | European Pat. Off. . |
| 05-66504 | 3/1993 | Japan . |
| 1523436 | 8/1978 | United Kingdom . |

OTHER PUBLICATIONS

Schadt & Funfschilling, 1990 Jpn. J. Appl. Phys., vol. 29, No. 10, pp. 1974–1984, *New Liquid Crystal Polarized Color Projection Principle*.

Maurer, SID 90 Digest, 1990, pp. 110–113, *Polarizing Color Filters Made From Cholesteric LC–Silicones*.

*Primary Examiner*—William L. Sikes
*Assistant Examiner*—Walter Malinowski

[57] ABSTRACT

Monocular and stereoscopic color display systems, wherein passive cholesteric liquid crystal (LC) filter/mirrors and active variable retarder type LC arrays are used in combination to produce low cost, high resolution, multicolor and full color displays, suitable for use as advertising, automotive, aircraft, computer, games and electron instrumentation displays.

24 Claims, 6 Drawing Sheets

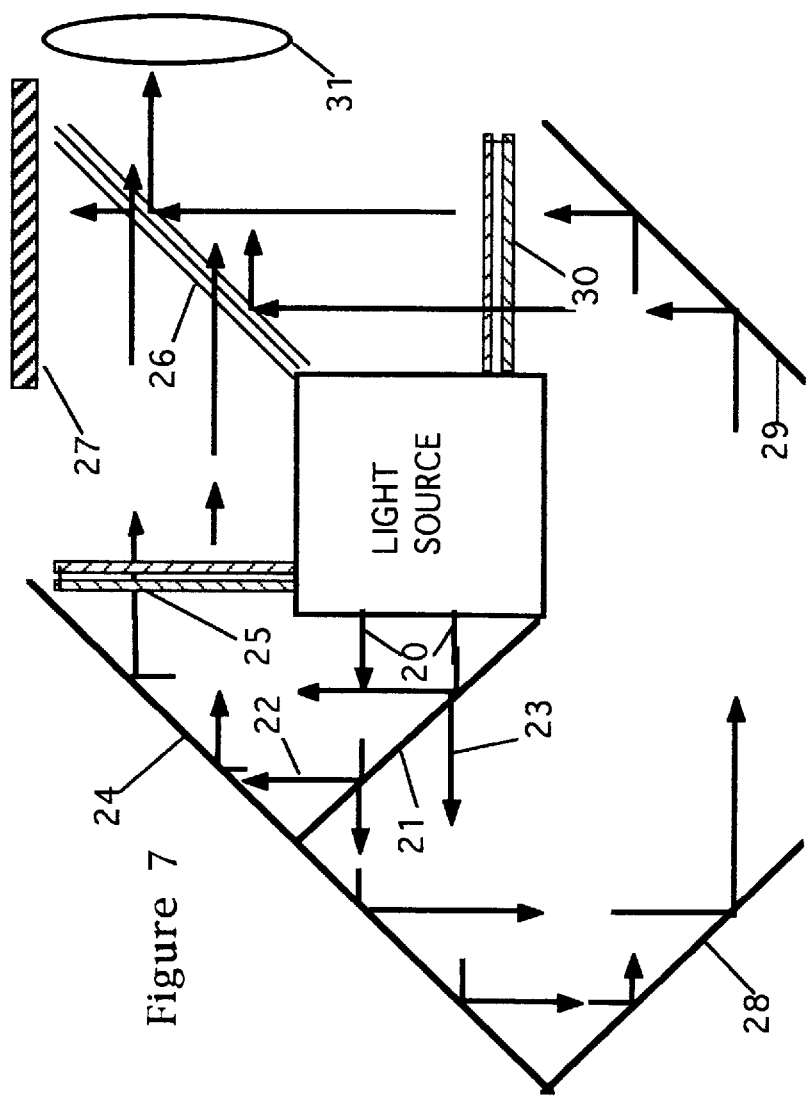

CHIRAL NEMATIC LIQUID CRYSTAL POLARIZATION MODULATED COLOR DISPLAY FOR STEREOSCOPIC VIEWING DEVICE

CROSS REFERENCE TO RELATED APPLICATION

This application is filed as a continuation of patent application Ser. No. 08/291,666 filed Aug. 17, 1994 and now abandoned.

BACKGROUND OF THE INVENTION

This invention relates to monoscopic and stereoscopic color display systems, wherein passive spectral polarization filters (particularly, chiral nematic Liquid Crystal (LC) filter/mirrors), and active LC arrays (particularly variable retarder arrays) are used in combination to produce high resolution color displays. By inference, displays using pleochroic/dichroic passive filters and twisted nematic active LC arrays are also possible using the methods of this invention. This application is related to Disclosure Document 315254 filed in the Patent and Trademark Office on Aug. 17, 1992. The contents of Disclosure Document 315254 are hereby incorporated by reference herein. The technology of color valves is closely related to the present invention, these devices modulate the color of light, generally through polarization and thereby color encode the displays of CRTs and the light entering certain color video cameras. The color valves of Buzak (U.S. Pat. No. 4,726,663) and Kalmanash (U.S. Pat. No. 5,082,354), use Chiral Nematic Liquid Crystal (CN-LC) filters in the devices of their inventions. But these devices are designed to operate in a field sequential mode to produce full color displays and produce three colors, with no switched "black state", while most of the devices of the present invention yield a complete or nearly complete color gamut, including a fully switched "black state".

There are Liquid Crystal Displays (LCDs) that offer various degrees of color, but these suffer from combinations of poor brightness or efficiency, inadequate color selection, poor color balance, low spatial resolution and limited viewing capability. While these are the basic compromises of any display, the devices of this invention, generally offer an order of magnitude improvement in the product of these factors. Among these liquid crystal displays are: Spatial Color Multiplexing (SCM) the chief technology for LCD based color displays, where three cells, with fixed color filters are grouped as a triad forming a single color pixel and depending upon which color is to be displayed, one or more of these cells are switched to some degree of "ON" and in the case of combination colors, the colors are combined by the eye, so that the viewer perceives the desired color. This process will be referred to as the Three Celled SCM (TCSCM) and it is the same principle upon which most color CRTs operate. The disadvantage of this system is that the spatial resolution of the display is considerably reduced, as compared to the CRT displays that produce only black/white images and the brightness of display is reduced since each element of the triad produces only one color in variable degrees and for many combination colors, one of the triad elements is emitting no light at all and the brightness must be further reduced, if some degree of color balance is to be maintained. This is to say that for balance to be achieved, the brightness of any color can be no greater than the brightness of the display when producing a single primary color, where only one element of the triad is producing light. To alleviate poor color balance, devices can be operated in a complementary color mode, where two cells of the triad are at least partially "on", but the degree of saturation of the colors and consequently the color gamut or the selection of colors suffers as a result.

In a second category are a number of color liquid crystal displays derived from the phenomenon of birefringence induced dispersion of plane polarized light, modulated by linear polarizers of various sorts. These displays generally fall into two categories, based upon whether the LCD is active or passive in the dispersion of the light. The passive devices disperse plane polarized white light through an element having a large amount of birefringence, which will angularly separate the planes of polarization of light of different colors, whereupon a LCD is used to modulate the various colors of plane polarized light by rotating the so dispersed light against a plane polarizer. In the selection process, more than one such LCD may be used, rotating the plane of polarization of the light both before and after dispersion of the light. And while this appears to be an excellent way to create colors, devices of this type suffer from a number of limitations: If shading of colors is desired, then the number of pixel colors must be limited; the efficiency is poor, since most of the light is absorbed by the filters of the system, leading to heating problems, which cause instabilities in the birefringent elements of the system; the modulation of the colors is very nonlinear; combination of colors such as "white" and all desaturated colors are only possible through SCM of the light from two or more cells. To remedy the "white" problem, the active display has received most of the attention. In this case the birefringence creating the dispersion is derived from the LCD itself, so that if the birefringence is eliminated in one switched state, a "white state" is possible, but desaturation of colors toward white remains a problem, as is the shading of colors toward black. The variation among devices of this type is in the linear polarizing means that are used, as illustrated by the patents of Conner (U.S. Pat. Nos. 4,917,464; 4,917,465; 4,966,441; 5,050,965; 5,124,818) and Mathewson (U.S. Pat. No. 5,122,887). The limitations that are present with both the passive and active devices of this technology are overcome by the teachings of the present invention.

Another technology that seeks to create a color LCD display is the guest host LCDs, which incorporate an absorptive or reflective element within the cells of the LCD itself. And in a stacked format of three such LCD's, they can produce a complete color gamut, although they too suffer from some of the limitations of the previous technology, such as poor brightness or efficiency and color balance. These devices also require that separate LCDs be produced for each color, whereas the LCDs of this invention are identical and therefore benefit from the economies of scale and mass production.

The final embodiment of this invention involves the application of the devices of this invention to produce stereoscopic displays. The existing technology consists of:

Anaglyphic methods, wherein two Stereoscopic Perspective Views (SPVs) are encoded with light or inks of two colors and the SPVs are decoded to the viewer's individual eyes by colored glasses, said glasses transmitting to each eye, only the SPV intended for that eye. This technology lacks the ability to produce a large color gamut. The technique was very popular about 40 years ago.

A method of using two projectors, with each SPV polarization encoded, such that the SPVs can be decoded to the viewer's individual eyes by polarizing glasses, which transmit to each eye, only the SPV intended for that eye. This system was developed by Land et al U.S. Pat. No. 2,203,687, over fifty years ago. Time sequential SPVs from CRTs, used with shuttered glasses, which are transmissive for each of the viewer's eyes, only at the time that the SPV for that eye is displayed upon a display device. Roese (U.S. Pat. No. 4,021,846) and others developed techniques for shuttered glasses. Time sequential, polarization encoded SPVs from display devices, wherein passive polarization decoding glasses are worn by the viewer, which transmit to the viewer's individual eyes, only the SPV intended for that eye. Bos (U.S. Pat. No. 4,719,507) describes such a method. Interlaced, polarization encoded displays, wherein the SPVs are presented simultaneously in an interlaced pattern, with each SPV encoded to the viewer's individual eyes by a polarization inducing medium placed over the interlaced SPVs, such that the light transmitted to each of the individual's eyes is only the light from the SPV intended for that eye, when polarization decoding glasses are worn by the viewer. Venolia (U.S. Pat. No. 5,050,961) describes such a method.

A method of encoding photographic film with polarization inducing CN-LC material and laminating said film to produce a film presenting both polarization encoded SPVs when projected upon a polarization preserving screen and having said polarization encoded SPVs, decoded to the viewer, by means of polarization decoding glasses, which transmit to each of the viewer's individual eyes only the image intended for that eye is described by Hall and Johnson U.S. Pat. No. 5,398,131.

The stereoscopic display of this invention relies upon none of the aforementioned techniques. But it does use image combining means employing CN-LC filter/mirrors related to the means used by Berman (U.S. Pat. No. 5,050,966).

SUMMARY OF THE INVENTION

Any description of this invention must begin with a description of the CN-LC filter/mirrors, which are one of the unique elements enabling this invention. The technology of CN-LC filters/mirrors is presented by Adams, Jr. et al., (U.S. Pat. Nos. 3,679,290 and 3,711,181) in which the inventor teaches the method of producing highly efficient circularly polarizing filters. These filters have the optical property of reflecting one handedness and color of Circularly Polarized Light (CPL) and transmitting opposite handedness of the specific color light and all other colors and handednesses of the light incident upon them. Thus the filters are also mirrors and they will be referred to as filter/mirrors. The filter/mirrors can be made to reflect any color, from within the infra red (IR) spectrum to well into the Ultra Violet (UV) spectrum and they can be made to reflect either handedness. The color or center wave length of the spectral response of the filter/mirror is determined by the amount of chiraling agent used in their fabrication, while the width or range of the distribution is determined by the birefringence of the host LC molecule. The light reflected is truly CPL only at the center frequency of the distribution and is increasingly elliptically polarized at wavelengths removed from the center frequency. However, the degree of ellipticity increases only very slightly until the edge of the spectral response, where for a very small band of wavelengths it changes very rapidly, but with little efficacy, since this is where the filter/mirror has rapidly decreasing effect upon the light impinging upon it.

At the present time there appears to be two basic ways to make these filter/mirrors. Both methods must provide a means of establishing and orienting the LC structure, so that the axis of twist of the structure is directed substantially normal to the substrate. In this orientation the viewer observes the Grandjean state of the LC. Most frequently, LC's are oriented by an alignment layer on the substrate and indeed this will be used here as well, at least in many embodiments of the CN-LC filter/mirror. The alignment layer may be created by simple or elaborate means, such as merely brushing or rubbing the substrate in one direction with cotton or by evaporating a material such as silicon oxide, having various states of oxidation, upon the substrate at a shallow angle (obliquely).

Another preferred method of establishing an alignment layer on a polymer substrate is by means of irradiating the substrate with a polarized laser beam, to create features or electrostatic fields in the substrate, which facilitate alignment of the LC layer. To create a filter/mirror by the first method, the CN-LC is confined between two transparent sheets, which may have an alignment layer upon its inner surface. Unlike other LC cells, the thickness of the LC in the filter/mirror cells is not critical, but ideally should be in the region of 3 to 10 microns and should be at least one micron thick, Ref. Adams, Jr. et al. (U.S. Pat. No. 3,711,181). If no alignment layer is present, the transparent sheets are sheared against each other to facilitate the alignment of the LC between them. To make a filter/mirror by the second method, a new CN-LC material is used. This material is what Wacker Chemie calls "Crosslinkable Cholesteric LC-Silicones" (CCLC-S) and it has the ability to be converted to the solid state, by the addition of a setting agent, cf. Ref. Maurer, Polarizing Color Filters Made From Cholesteric LC-Silicones, SID 90 Digest, 1990, pp 110–113. This material starts as a thick paste, exhibiting no LC properties, but when activated by heating to 60° to 90° C., the CCLC-S becomes a thin LC liquid, which can be aligned by several methods. One can use an alignment layer alone or in connection with other methods. The other methods include: Running a doctor blade or a roller over the heated CCLC-S material; or slightly shearing the material between glass plates when making a filter/mirror. Then, after alignment, the material is "set" or made solid. This is usually done by adding a thermal or photo setting agent to the CCLC-S material, so that it sets when exposed to heat or a UV light. The rolling and doctor blade processes for aligning the LC can have some advantage, in that "open faced" filter/mirrors having more than one filter/mirror layer are possible, which can be important when considering the cost to produce the filter/mirrors and/or the reflections of light at the individual filter/mirrors. This also allows for a highly compact design, when it is important to place the system components as closely together as possible. In such applications the "open faced" filter/mirror may be sealed directly to other system elements, such as the LC-VRA, to be discussed shortly, merely by heating the filter/mirror and pressing the two elements together.

The basic principles of this invention are illustrated by the two Liquid Crystal Variable Retarder Array (LC-VRA) shown in FIG. 1. The cells of the LC-VRA are used to polarization modulate polarized light passing through them. The polarization modulation can occur by two methods, the waveguide mode and the birefringence mode. Some LCDs, such as the pi cell devices can not operate in the waveguide mode, but nearly all LCDs will operate in the birefringent mode. To operate in the waveguide mode the cells contain LC which has 90° of twist across the cell in the "off state" of the LCD and plane polarized light is used with the plane of polarization being aligned to the axis of the cell's LC's molecules, so that in the "off state" the plane of polarization of the light will be twisted by 90° as it remains aligned to the molecular axes of these molecules as it traverses the cell. In the birefringent mode the plane of polarization is aligned at 45° to the axis of the molecules (optical axis) and the plane polarized light is broken into two components, one of which is aligned with the axis of the molecules and the other aligns across the axis of the molecules and if the cell is constructed to yield a half wave retardation in the "off state", then light that was in phase when entering the cell, will be totally out of phase at the exit, causing a 90° rotation of the plane of polarization. When a cell operating in either mode is switched "on", it has no effect upon the light passing through it. The advantage of using the waveguide mode of operation is that this mode is more stable with temperature variation of the cell. It is thought that in most applications of the present invention, the temperature variation of the retarder's LC should not be a problem, since the elements absorb very little of the light passing through them. When using the waveguide mode, the light must then be converted to CPL by a quarter wave plate, since the CN-LC filter/mirrors most effectively reflect CPL. In polarization modulation of CPL by the LC-VRA, the "off" cell again is a half wave plate and it converts CPL of one handedness to that of the opposite handedness. In switching the handedness of the light in the individual cells, the LC-VRA is a spatial modulator (LCD), as well as a polarization modulator. And while the individual cells or pixels of the arrays modulate the polarization, the CN-LC filter/mirrors of the device, with their selective color and polarization handedness characteristics, modulate the color of each cell of the display by reflecting out of the beam of light passing through a cell, those colors which are not desired in the image formed by the spatial modulation.

With two LC-VRAs and the proper configuration of CN-LC filter/mirrors, there are four "fully-switched" states of the display in any cell, which give a single cell of the array the ability to produce any one of three colors and black in the "fully-switched" condition. And later it will be shown that in this device having only two LC-VRAs, nearly any color is possible within a single cell, other than those near the red/blue line (purple/indigo) of the well known C.I.E. color chart. This increased color gamut is possible by the use of halftones (switching to intermediate states) on the LC-VRA. And by using halftone switching all the saturated colors can be produced at a constant "brightness" (flux density).

BRIEF DESCRIPTION OF THE DRAWINGS

FIG. 7 illustrates a novel stereoscopic display utilizing the display devices of this invention.

DETAILED DESCRIPTION

Figure 1:
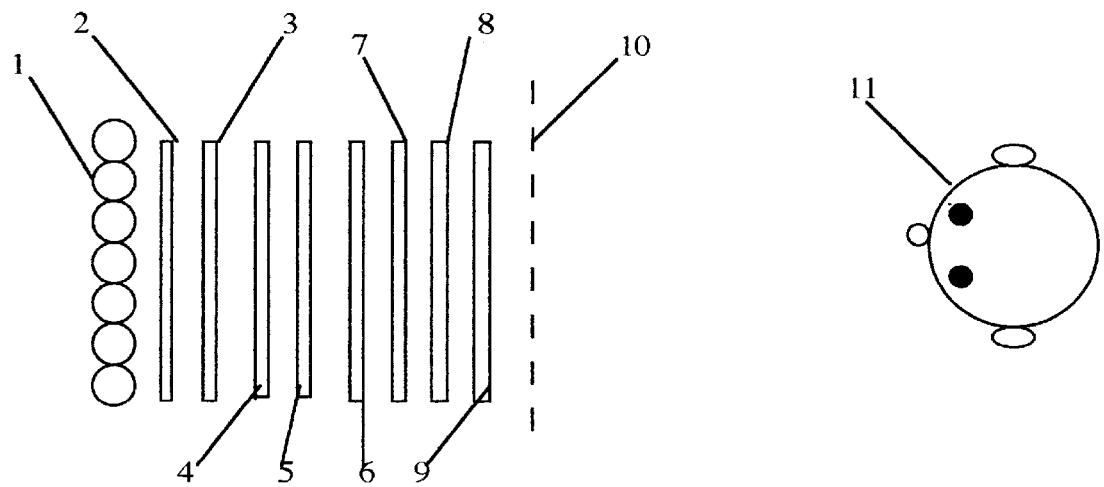
FIG. 1 illustrates an embodiment of the invention having two active LC arrays (5 and 9) and six passive spectral filters (2, 3, 4, 6, 7 and 8)

FIG. 1 illustrates one of several combinations of LC display arrays and CN-LC filter/mirrors which will produce the desired three primary colors and black. In this figure, the light source (1) directs white unpolarized light to the first CN-LC filter/mirror (2), which reflects left handed green CPL and transmits all other colors and handedness of the light to the second CN-LC filter/mirror (3), which reflects right handed red CPL and transmits all other colors and handedness of the incident light to the third CN-LC filter/mirror (4), which reflects left handed blue CPL and transmits all other colors and handedness of the incident light to the first LC-VRA (5), which either leaves the light unaffected or changes the handedness of the light passing through its switchable cells. Next, the light travels to another CN-LC filter/mirror (6), which reflects right handed blue CPL and transmits all other colors and handedness of the light to the next CN-LC filter/mirror (7), which reflects left handed green CPL and transmits all other colors and handedness of the light to the last CN-LC filter/mirror (8), which reflects right handed red CPL and transmits all other colors and handedness of the light to the second LC-VRA (spatial/polarization modulator) (9), which as with the first LC-VRA, either changes the handedness of the light or does not affect the light passing through its individual cells. The last element in the stack is a conventional circular polarizer (10) of either handedness in this case.

The logic tree of Table I illustrates how the specific colors are derived from switching the arrays. With this configuration the four desired states are present in either RH or LHCPL. And table III is a graphic representation of the results, with the upper case color states describing the display with a Right hand Circular Polarizer (RHCP) as the exit polarizer (10) and the lower case color states describing the display with this polarizer (10) transmitting Left Hand Circularly Polarized Light (LHCPL).

In the devices of this invention, the collective distributions of the colors reflected by the CN-LC filter/mirrors extend across the visible spectrum of light. And devices can be configured that utilize a greater or lesser number of colors and CN-LC filter/mirrors, having more or fewer, "fully switched" color states.

Figure 2A:
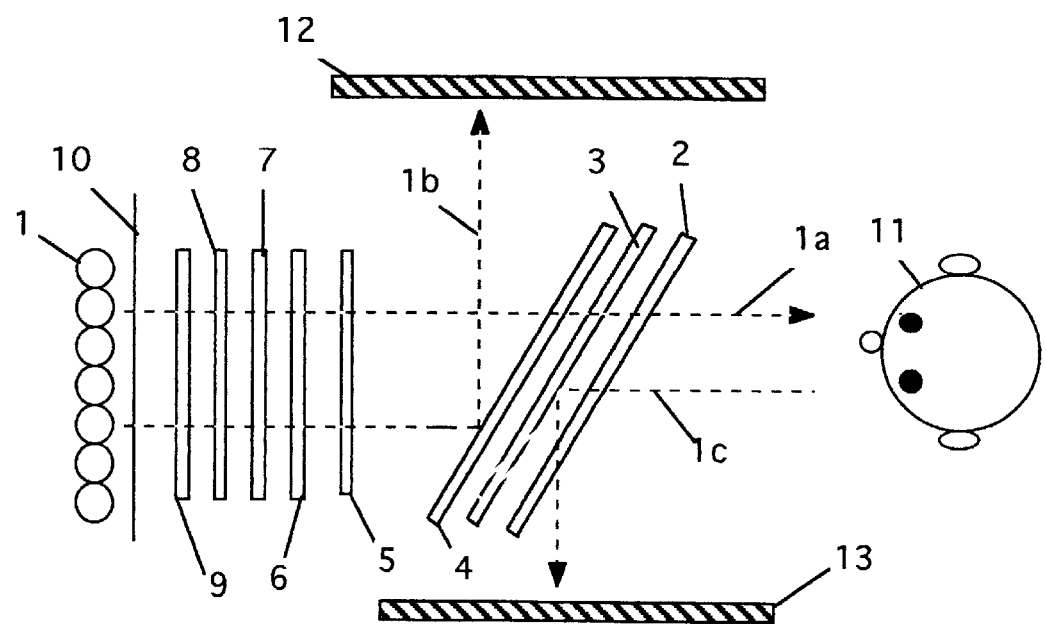
FIG. 2a illustrates an embodiment similar to that of FIG. 1, but wherein the exit spectral filters (2, 3 and 4) are inclined relative to other elements of the device.
Figure 2B:
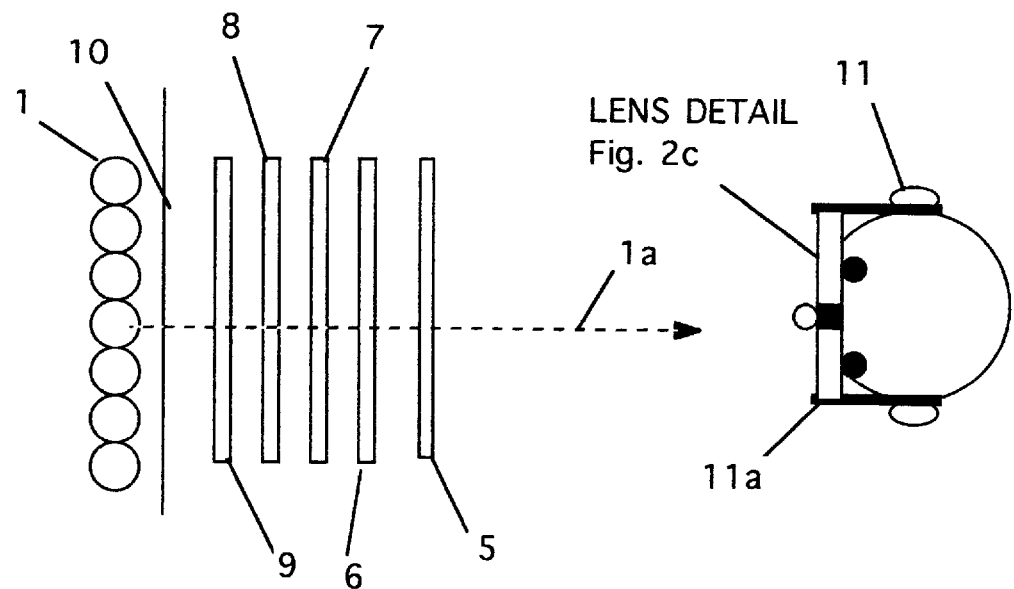
FIG. 2b illustrates the embodiment of FIG. 1 or FIG. 2, wherein the exit spectral filters (2, 3 and 4) are incorporated in glasses (11a) worn by the viewer (11)
Figure 2C:
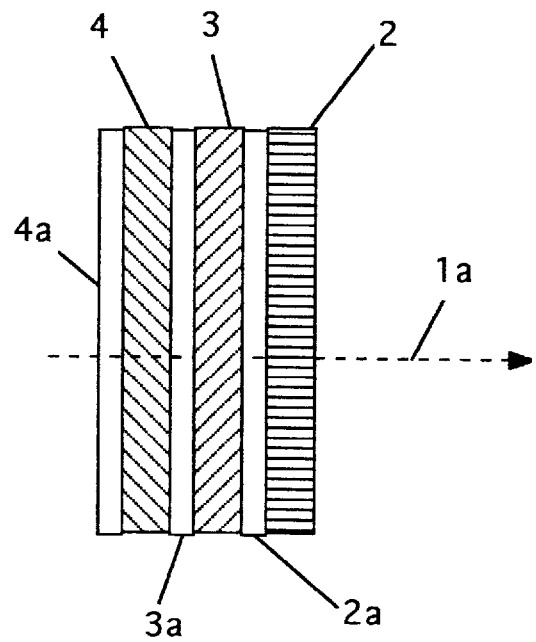
FIG. 2c illustrates the lens detail of the glasses (11a) of FIG. 2b.

The device of FIG. 1 is reconfigured in the embodiment of FIG. 2a. Note that the entire stack of CN-LC filter/mirrors and LC-VRA elements is reversed in order from the first embodiment. In addition the exit CN-LC filter/mirrors (2, 3 &4) are inclined to the axis of the display and light absorbers (12 & 13) have been introduced. The exit filter/mirrors (2, 3 & 4) are inclined to the axis of the display at an angle that will reflect the unwanted species of light and heat (1b) into a light absorber (12) while transmitting the desired species of light (1a) to the viewer. In doing this the CN-LC materials used in all the filter/mirrors must be modified slightly to reflect the proper colors at the angle with which the light will impinge on them. Inclining the exit CN-LC filter/mirrors has a two fold advantage: the energy from the unwanted light can be absorbed away from the display's components, to minimize heating of those components; in direct view applications, much of the ambient (room) light (1c) is reflected into absorber (13), while the color and handedness of room light transmitted by the exit filter/mirrors generally proceeds completely through the device to the light source. However, the colors and handedness of room light, that were subtracted from the source light by the first stage filter/mirrors, will be reflected back to the viewer (11), desaturating the display colors slightly in very high ambient light conditions. From this, the importance of using this technology, either in low ambient light or hooded conditions and in projection displays becomes obvious. Desaturation of the display colors by high ambient light levels can also be minimized by incorporating the display's exit filters (2, 3 &4) into glasses (11a) worn by the viewer (11) as shown in FIG. 2b, since very little light will be incident upon the filters (2. 3 & 4) from the viewer's side of the glasses (11a). The lens detail is illustrated in FIG. 2c, where the CN-LC filters (2, 3 & 4) are shown together with optional centiwave correctors (2a, 3a & 4a), to be described later.

The importance of reducing the heating of the modulating elements (9 & 5), particularly the LC-VRC, is because the birefringence and thus the retardation of the cell, is highly temperature dependent, so that when the retardation changes, the CPL of an "off" state cell becomes elliptically polarized and some of this light is not then reflected from the CN-LC filter/mirrors used to modulate it, or in the other case where the light (1a) is modulated to pass through a filter/mirror, some of the light (1b) will be reflected, if it is elliptically polarized. This problem of component heating can be eliminated by methods disclosed in other patents, but this should be unnecessary in most applications, if the source of the heating is reduced by inclining the exit filter/mirrors. As will be shown, inclining the exit filter/mirrors (2, 3 & 4) has some brightness penalty, it also largely eliminates some deleterious higher order effects, resulting from reflections from these elements (2, 3 & 4).

Another modification, that can be made to the device of FIG. 2, is to make the initial polarizing filter (10), a five layer CN-LC filter/mirror, which has two layers devoted to reflecting both handedness of broad band Infra-red light back into the light source. The remaining three layers reflect one handedness of CPL for each of the primary colors. In this case the CN-LC filter/mirrors would reflect RHCPL into the light source, where some of this light could be returned as LHCPL which will pass through the initial polarizer (10), enhancing the efficiency and brightness of the display slightly. There are five main advantages to using a CN-LC filter/mirror, rather than a conventional absorptive polarizing filter: The efficiency of the CN-LC filter mirror is 49% to 45%, compared to about 38% for the absorptive filter; the CN-LC filter/mirror is significantly less expensive; the degree of circular polarization across the spectrum is better; the filter is heated very little by the light it processes; the handedness of the individual colors of light can be varied, allowing the light in the output of the display to be of various handednesses or all the same handedness.

The logic tree for the switching of this embodiment is presented in Table II and the illustration of the results are in Table IV, where the colors for half state switching are also shown. In this table it is shown that there is a red and blue halftoning row and column. The significance of this is that these colors can be independently dimmed to black by varying a switching array cell from an "on state" to an "off state". This gives the ability to shade in these colors and combination of colors, and also, through two cell SCM create any color between red and blue (violet/purple region). Note, that two cell SCM system is much superior to TCSCM, because there is very little resolution degradation with two cell SCM as compared with TCSCM. Highlighting and shading are also easily achieved with two cell SCM.

Table IV shows that by halftoning with the first polarization modulator (switching array) cell, with the second switching array cell in the "on" state, any color between red and green can be produced in a single cell of the array and similarly, by halftoning the second polarization modulator, with the first switching array cell in the "on state", we can create any color between green and blue. This then gives the ability to create any saturated color around the perimeter of the C.I.E. color chart, except those between blue and red, which can be obtained through two cell SCM. There is also a definite "black state" and by halftoning the cell to various degrees, in both switching arrays, a "white state" and most colors, except those near the red/blue line are possible and all the colors can be desaturated toward white. In desaturating a color toward white, the color will lose some brightness relative to its saturated state, but this loss is relatively insignificant, such that a color that is fully desaturated to white, which is the halftone white state, is ¾ as bright as a "fully bright" primary color. But, if the exit filter/mirrors are not inclined, the white state brightness will increase to about 92% of the brightness of the average primary color.

Figure 3:
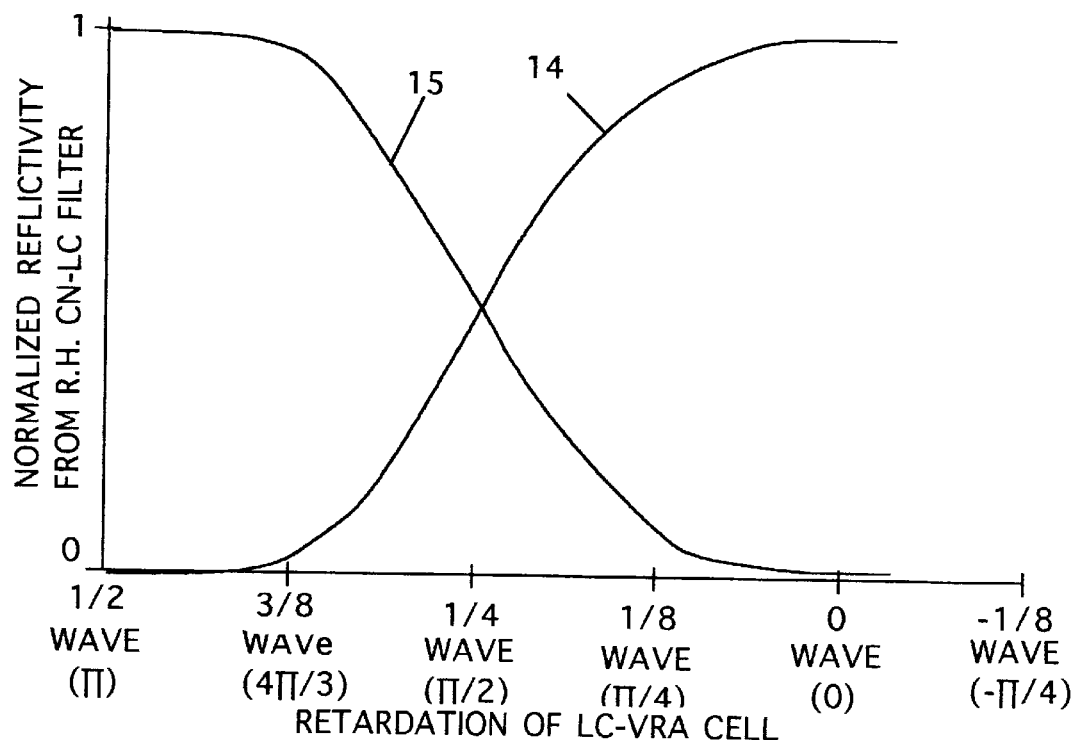
FIG. 3 illustrates the polarization switching and color modulation characteristics of a cell of a variable retarder array of this invention.

Halftoning is achieved by switching the cells to an intermediate state between "on" and "off", and as a cell is turned from "on", where it has no effect upon the light passing through it, toward "off", where the cell becomes a half wave retarder and the handedness of the light is reversed. The light is initially changed to elliptical polarized light of its original handedness, with the ellipticity increasing until, when the cell forms a quarter wave element, the light is linearly polarized and as the retardation of the cell continues, through more "off state" biasing of the cell, the light becomes first highly elliptically polarized of a handedness reversed from its original state, with the ellipticity decreasing until the light is circularly polarized at the full "off state" condition. In halftoning a cell from "off" to "on", the opposite changes occur. Elliptically Polarized Light (EPL) can be viewed as a combination of linear and circularly polarized light and the CN-LC filter/mirrors interact with each of these components, if there is a color match between the light and the filter/mirror. If the circularly polarized component of the EPL is of the handedness that is reflected by the filter/mirror, then this component is reflected; if not, it is transmitted. The linearly polarized component of the light, from either handedness of EPL, has half its intensity reflected as CPL of one handedness and the other half transmitted as CPL of the opposite handedness. Illustrating the "changes of state" and the effect it has upon the reflective characteristics of a CN-LC filter/mirror are the curves 15 & 14 in FIG. 3. As the birefringence of a cell is changed, the retardation of the cell is also changed and the light reflected by a CN-LC filter/mirror of the proper color and handedness, will have the relationship with this retardation, where the intensity of the light of one switched state, e.g. 14 or 15, increases or decreases with the decreasing retardation, by an amount proportional to the $\sin^2$ or $\cos^2$ of half the retardation angle. To further illustrate, in Table II, when both switching cells are "ON", the color produced is Green and when the first switching cell remains "ON" and the second cell is switched "OFF", the cell produces Blue. So, to understand the halftone process, consider what occurs in the second switching cell and at the CN-LC filter/mirrors, as the second cell is changed from "ON" to "OFF". In view of the illustration of FIG. 3, observe that the light entering the cell of the second spatial modulator (5 in Table II) is LHCP green and blue light and when the cell is "ON", this same handedness of light passes out of the cell, onto the CN-LC filter/mirrors, with the filter/mirror that reflects blue LHCPL, eliminating the blue light and allowing the green LHCPL to pass to the viewer, Cf. #14 is green and #15 is blue in FIG. 3. And when the cell of the second spatial modulator if "OFF", the green and blue light are changed to RHCPL, and the CN-LC filter/mirror that reflects green RHCPL, eliminates the green light, allowing the blue light to pass to the viewer. Consider also what occurs when the cell of the second spatial modulator is ¾ "ON", forming an ⅛ wave plate, so that the green and blue LHCPL becomes Left Hand Elliptically Polarized Light (LHEPL), with a large component of LHCPL and a small component of Linearly Polarized Light (LPL). When this light encounters the CN-LC filter/mirrors, the filter/mirror that reflects blue LHCPL, will reflect the large blue component of LHCPL and half of the blue LPL, while transmitting all of the green LHEPL to the CN-LC filter/mirror that reflects green RHCPL. Here, half of the green LPL is reflected, and the green LHCPL, together with the half of the green light that was linearly polarized, passes to the viewer. So, in this exercise, it is obvious that the total amount of light passing to the viewer is the same. What is lost from the green is replaced with blue light and as the retardation of the cell of the second spatial modulator increases, so too does the ratio of blue light to green light, until, in the limit, the cell is "OFF" and all the light going to the viewer is blue. This analysis only considers first order reflections from the CN-LC filter/mirrors and this results in constant luminance flux. This is demonstrated mathematically, in that the intensity curves (15 & 14) of FIG. 3, are $\sin^2$ and $\cos^2$ functions of the retardation and the intensity or flux of the light is the sum of these curves (14 & 15) at any amount of retardation and since a $\sin^2$ plus $\cos^2$ of any angle is equal to one, then the luminous flux from this device is constant over all angles of retardation.

As noted, the above analysis treated the effects of the first order reflections from the CN-LC filter/mirrors. The second and higher order effects result from reflections of modulated light by the CN-LC filter/mirrors, after the first order reflections. The second order being for paraxial reflected rays and the third order effects being from reflections which direct the light off axis. It appears that the second order reflections resulting from "fully switched states" of the liquid crystal switching arrays are innocuous, as long as the reflected light returns to the light source by the same route it traversed from the source to the reflective filter, which is the case for well collimated systems. The more interesting second order effects occur when cells are switched to halftone states. In this case LPL impinges upon a CN-LC filter/mirror having a color match with the LPL, then half the light is reflected as CPL of one handedness and the remainder of the light is transmitted as CPL of the opposite handedness, which, when the reflected CPL again traverses the liquid crystal switching cell, which originally converted it from CPL to LPL or EPL having a high LPL content (LPL plus), the light is changed again into LPL plus, which continues toward the light source, but if the halftoning cell is in the second liquid crystal switching array, then, the light will encounter other CN-LC filter/mirrors, one of which reflects light of the same color as the LPL, whereupon half of this LPL is again reflected as CPL, and this light again traverses the switching cell and is converted back to LPL plus, that again encounters the original reflecting CN-LC filter/mirror, whereupon half of this light is reflected as CPL and half is transmitted to the viewer. And the reflected component begins the process once again. The net effect of this is that the brightness of the pixel is increased somewhat. In the case of a pixel producing white light in the two liquid crystal switching array, the brightness is increased from about ¾ of the average primary color brightness, to 92% of the average primary color brightness. The brightness of the complementary colors is also increased by a similar amount, as is shown by curve # 19 in FIG. 4. This effect does not occur when the exit CN-LC filters are inclined, as shown in FIG. 2. Third order effects result when light, arriving at the viewer, has passed through the display system by a pathway involving more than one pixel. Third order effects, if present, reduce contrast, color purity and can result in ghost images in severe cases. These effects result from poor collimation of the light from the source, poor alignment of this light to the axes of the pixels, and poor perpendicularity in the stacked format, of the planes of the CN-LC filter/mirrors to the collimated light and axes of the pixels. Two techniques can virtually eliminate the third order effects: by inclining the CN-LC exit filter/mirrors, all the unwanted reflected light is directed out of the display system and second, by using a "black surround" of the cells of the LC-VRAs, which will "stop-out" the skew rays, to a large extent. The "black surround" appears to be a necessity for nearly any high contrast LCD display and the requirements for these devices are no greater than others. The brightness comparisons of this invention were made with a "black surround" comparable to that used on the color display with which the comparison was made.

An interesting aspect of the halftoning process is that the intermediate switched states of a cell do not have to be stable with time, which is to say that the cell can change its retardation somewhat and provided the condition is "refreshed" within the eye's response time, the color appears stable, with the viewer seeing the average color. This results from the intensity of one primary color (which is being diminished by the changing retardation) being a little too great at the beginning of the change of retardation and a little too small at the end of the decay cycle, with the other primary color doing just the opposite. For halftone considerations, in many applications, there is no need to use the more expensive and lower transmission Active Matrix LCDs (AM-LCDs) that have transistors built into each cell. The full "on state" conditions of the Passive Matrix LCD is slightly different than the halftone case. In this case, the cell is supposed to have no effect upon the light but, as soon as some retardation is introduced by a change of the decaying electric field in the cell, the LC will introduce some degree of ellipticity to the CPL going through the cell. But this poses no serious problem for two reasons: First, the onset of retardation occurs slowly as the full state field changes in LCDs, so that small changes of the field will produce no visible effects, Cf. FIG. 3. Secondly, any ellipticity that is introduced merely means that some small amount of light that should be transmitted by a CN-LC filter/mirror is reflected out of the display and/or some small amount of light that should be reflected is transmitted. This latter case is the more objectionable, since it tends to diminish the black contrast of the display. But, this problem can be eliminated by designing the switching logic so that the "black state" is created when all switching cells are in the "off state", where there is no field in the cell and thus, no decay of the field. And the exacting construction requirements to make an "off" cell a "near perfect" halfwave retarder for the specific colors that are to be modulated by the CN-LC filter/mirrors, can be relaxed by the use of what might be called centiwave retarders (or centiwave plates), which when placed on the specific CN-LC filter/mirrors and adjusted, will introduce corrections of retardation for the specific color to be modulated. The chief purpose of the centiwave retarders and the reason that they were conceived is to correct for chromatic dispersion effects resulting from operating the switching arrays in the birefringent mode. Note that a halfwave plate is not a halfwave plate for all wavelengths, so that some of the CPL being altered by the switched array, does not maintain its circular character without some correction, which happens to also be able to correct for imperfections in the manufacture of the switched array.

The centiwave retarders are placed directly upon the CN-LC filter/mirrors for which they are making the correction of the light to be reflected or the CN-LC filter/mirrors can be placed directly upon the centiwave plates. And the retardation correction can be tested before assembly of the complete display. One might think that the centiwave retarders would be expensive and difficult to select for each application, but this too, is not the case. A centiwave retarder need to be nothing more than a sheet of thin, transparent, stretched and possibly somewhat annealed (drawn back) plastic film or sheet. Almost any sheet of plastic that one examines has more than sufficient birefringence resulting from the manufacturing process, so some annealing of these sheets may be necessary. And while the sheet to sheet tolerance on the retardation is very generous, the tolerance across the individual sheets must be tightly held, but this appears to be a characteristic of plastic sheets that are commonly available.

To make corrections of the retardation with the centiwave elements and produce a completed device, one could begin by applying the CCLC-S filter/mirror material upon the centiwave plastic sheets. The LC-VRA and the centiwave plates with the CN-LC filter/mirrors on them are assembled in order, with the light from the light source impinging on the centiwave plate before passing to the centiwave plate's CN-LC filter/mirror. And a circularly polarized light of the correct handedness is passed through the stack of elements. The switching arrays are switched to the "black state", which is usually all cells of all arrays in the "OFF" state, where no potentials are applied to the cells, so no electronics are even required for this test. Then individually, starting with the filter/mirrors nearest to the light source, the CN-LC filter/mirrors and their centiwave elements are rotated about the axis of the system, with each filter/mirror eliminating a color, until the blackest black is obtained. The physics of centiwave correction is based upon the fact that the orientation of the optical axis of retarders has no consequences upon CPL. And as the optical axes of two retarders are rotated relative to each other, the net retardation and orientation of the optical axis of the system changes and these changes can be used to tune the net retardation to any desired value. Thus, the rotation process works the birefringence of the centiwave plate against that of the "off state" cells of the LC-VRA, so that the net retardation can be increased or decreased relative to that of the LC-VRA alone. Each centiwave plate affects all the light passing through it, thus in introducing the correction for each subsequent filter/mirror in the stack of filter/mirrors, the retardation effects of the centiwave plates through which the light has passed must be taken into account, and this naturally occurs in the adjustment process. This explains why the adjustment of the centiwave plates begins with the furthermost filter/mirror from the viewer.

The open faced CN-LC filter/mirrors are then heated, by merely blowing hot air across their surface, while maintaining their orientation relative to each other and the switching arrays. When the surface temperature of the CN-LC material reaches 70° to 90° C., the filter/mirror material softens and the filter/mirrors can be pressed onto the switching arrays and the centiwave substrates of other filter/mirrors, while maintaining the critical alignment of the cells of the LC-VRA. When the assembly cools, the excess centiwave/filter/mirror material can be trimmed and the unit wired and sealed. There are other methods of making and applying the centiwave retarders for this application, but none of them appear as efficacious as the method heretofore described.

Figure 4:
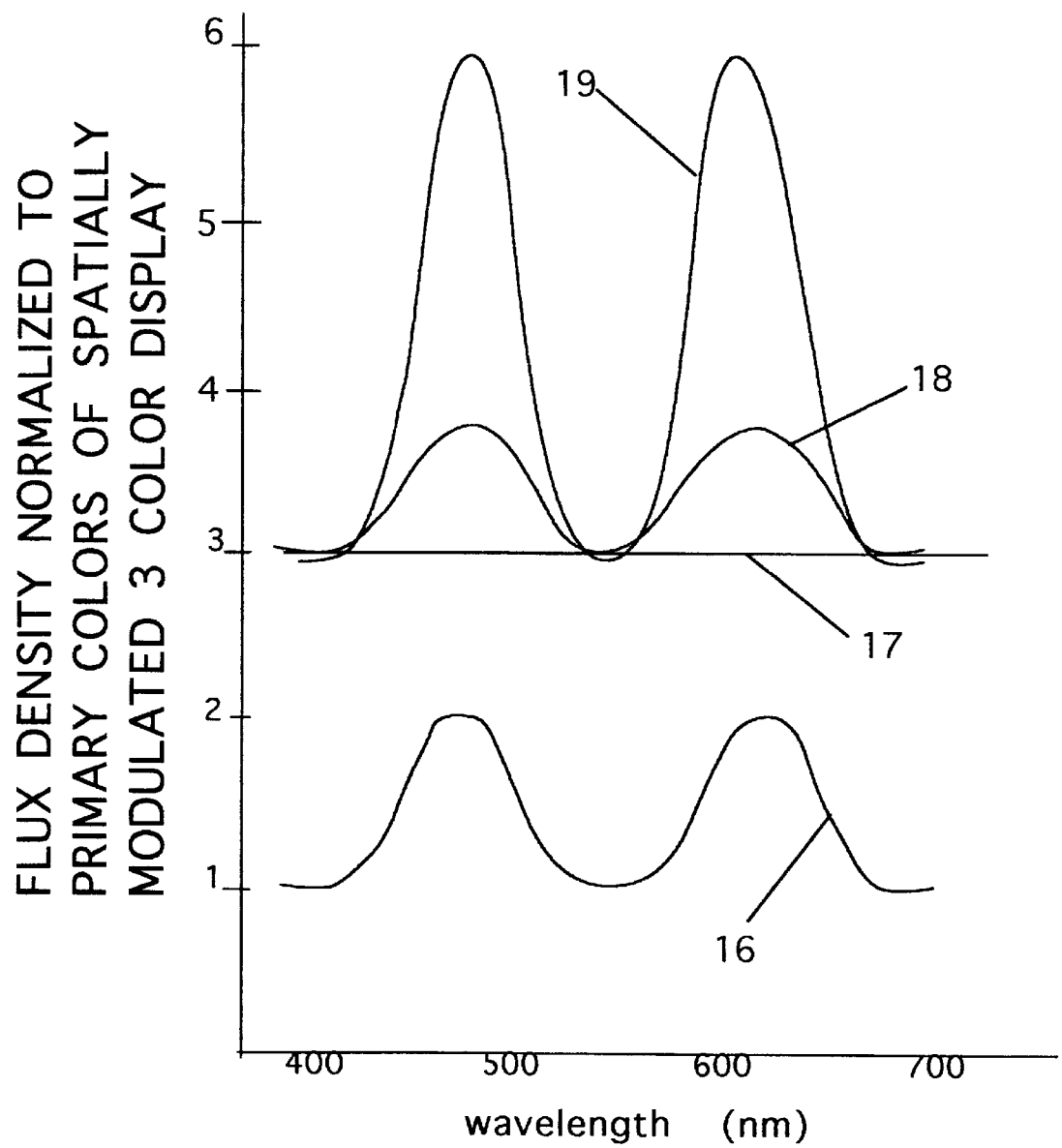
FIG. 4 illustrates the color intensity characteristics for various embodiments of this invention and the prior art.
Figure 5:
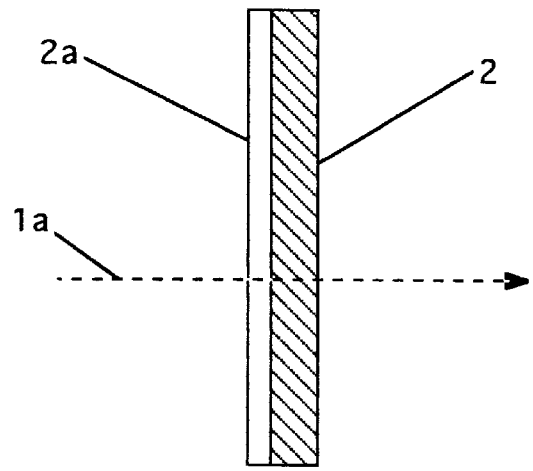
FIG. 5 illustrates the structure of a passive spectral filter (2), having a centiwave retarder (2a), transmitting light (1a)

FIG. 4 illustrates the difference in brightness of these displays. In this figure, the vertical scale can be considered as the normalized brightness of the conventional full color primary colors, which is to say that since brightness is a subjective measure of the perceived flux density by an average human observer, then in normalizing brightness for the primary colors, it becomes a measure of flux density, which the vertical scale specifies and this is the sense in which brightness has been used throughout this document. Curve # 16 shows how this "brightness" of the display changes through the spectrum of colors, at full intensity for the TCSCM devices. While curve # 17 shows how the "brightness" from the device of FIG. 2a, varies relative to the spectrum and the conventional full color display (16). Curve # 18 is the brightness profile of the device of FIG. 1 or the device of FIG. 2a, when the exit filter/mirrors are not inclined, so that the second order reflection effects upon the display are included. And, although the eye perceives the color balance somewhat differently, due to its spectral response, it should nevertheless find the display of the device of FIG. 2a with its inclined exit filter/mirrors, somewhat more balanced and pleasing in most applications. However, the reduced white brightness relative to the primary colors would make it difficult to realistically display intense bright fields of light, such as images of the sun.

Figure 6:
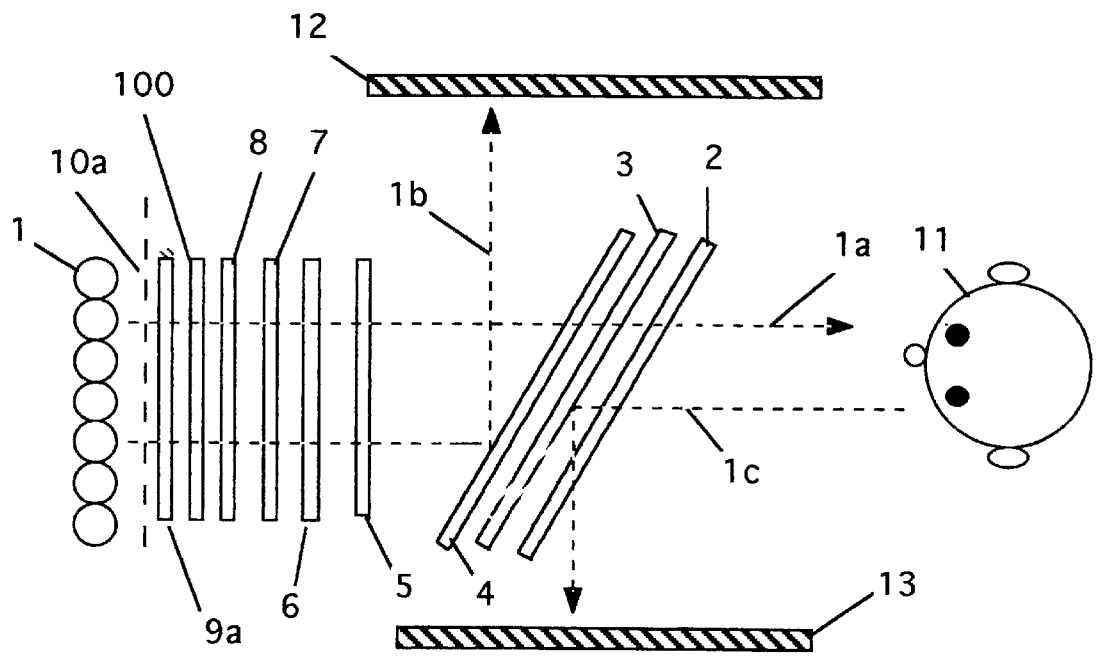
FIG. 6 illustrates an embodiment of the invention having two active LC arrays, one (5a) of which utilizes linearly polarized light and a quarter wave plate (100) with passive spectral filters (3 and 4)

The idea that a LCD (9a) can polarization modulate plane polarized light and then convert that light to circularly polarized light of either handedness by use of a quarter wave plate (100) on the exit of the LCD (9a) is illustrated if FIG. 6 and indicates that this principle can also be used with the other devices of this invention. In this way the LCD can be operated in the "waveguide" mode, where possible changes of birefringence of the liquid crystal cell (LCD), resulting from component heating, has less effect upon the display. Such a configuration is illustrated in FIG. 6, where a linear polarizer (10a) is placed between the light source (1) and the first switching array (9a), followed by a quarter wave plate (100) to convert the linearly polarized light of both polarization orientations to RH & LHCPL, for intensity modulation by the spectral filters (6, 7 and 8), which follow.

The final preferred embodiment of this invention, is a display system utilizing the aforementioned concepts, to produce a stereoscopic display for projection or direct view. FIG. #7 illustrates the basic configuration of this stereoscopic display. The light source produces substantially collimated unpolarized white light, whose spectral distribution approximates the spectral distributions of the CN-LC filter/mirrors, in the mode for which the light falls upon the filter/mirrors. In FIG. 7, the light (20) from the "light source" impinges upon the inclined CN-LC filter/mirror (21), whereupon, one handedness for each color of this light is reflected (22) and the other handedness of each color (23) of the impinging light (20)) is substantially transmitted through the CN-LC filter/mirror (21). The reflected light (22) is then directed to a spectral reflector (24) or another CN-LC filter/mirror (24), of handedness the same as CN-LC filter/mirror # 21. From the spectral reflector or CN-LC filter/mirror #24, the polarized light of one or more handednesses, is directed to the liquid crystal switching array assembly (25), which will polarization encode one Stereo Perspective View (SPV) of the pair of SPVs of the stereo image to be presented to the viewer, by means revealed earlier. The polarization encoded light passing from this array travels to a set of three inclined CN-LC filter/mirrors (26), which reflect the undesirable colors of light of the first SPV into the light absorber (27), transmitting to the projection lens (31) or directly to the viewer a polarization encoded image of the first SPV. And returning to the light (23), which was transmitted by the CN-LC filter mirror (21), which is of the opposite handedness(es) of that (22) which went to form the first SPV, this light (23) is similarly directed by an extension of the first spectral mirror (24) or a separate CN-LC filter/mirror of handedness(es) opposite to that of CN-LC filter mirror # 21, located in the position of the extension of spectral reflector #24, which directs the light to spectral reflector or CN-LC filter mirror # 28, being substantially the same as the extension of reflector # 24, which further directs the light to spectral reflector or CN-LC filter/mirror # 29, being substantially the same as reflector # 28, which further directs the light to the liquid crystal array (30) modulating the second SPV. Then, the modulated light, leaving this liquid crystal array (30) travels to the inclined CN-LC filter/mirrors (26), having the same liquid crystal materials that modulated the light (22) for the first SPV, these filters/mirrors (26), reflects the desired color and handedness(es) of light for the second SPV to the projection lens (31) or directly to the viewer, while transmitting the undesired color and handedness of the CPL into the light absorber (27). The distance the light travels from each display to the projection lens or to the viewer is the same, so that both images appear in the same plane. And in projection, a polarization preserving screen is used, which presents to a viewer the different, but superimposed images of the two SPVs, with polarization decoding glasses that transmit to each eye, only the SPV intended for that eye, so that the viewer perceives a color stereoscopic image.

Considering that spectral reflectors change the handedness of the CPL incident upon them, while the CN-LC filter/mirrors do not, the reflectors of the system are selected to ensure that modulated light of the two SPVs, having opposite handednesses, arrive at the final CN-LC filter/mirrors (26). This condition is assured if the redirecting reflectors (24, 24 extension, 28 and 29), numbering four are changed in pairs, meaning that no one of these reflectors could be CN-LC filter/mirrors; two of them could be of either type or all four of them could be reflectors of either type. Within the liquid crystal arrays (25 & 30), the handedness(es) of the interstitial CN-LC filter/mirrors must be of opposite handedness(es), if the color switching logic of liquid crystal arrays, presenting both SPVs is to remain the same.

The CN-LC exit filter/mirrors must be able to reflect the three primary component colors of the second SPV, so that three CN-LC exit filter/mirrors are required. Thus, two additional CN-LC exit filter/mirrors must be added and these filter/mirrors must be made with the CN-LC materials that will transmit the primary colors of the first SPV and reflect the primary colors of the second SPV. However, in doing this one loses some of the advantages of the three switchable liquid crystal array device, in that it is no longer possible to have a "fully switched" white state, nor most "fully switched" complementary color states. Yet, "white" and all colors, hues and shades are possible through the use of halftone states as previously discussed. And by these means, the "white state" brightness is one and one half times brighter than the average primary color. This could be an excellent display for stereoscopic T.V., but the two liquid crystal array based stereoscopic device would probably be quite adequate for stereoscopic computer graphics applications.

There is also the possibility that these stereoscopic display devices may have artifacts in the display, particularly when using halftones, resulting from interference between the light from the two SPVs. These defects will occur at dislocations in the CN-LC structure on the exit filter/mirrors, and should in fact have very little impact upon the viewer in most applications. But should such artefacts present a problem, if incoherent light is used, the interference can be eliminated by making the difference of path length of the light from the light source to the exit filter/mirrors, for the two SPVs, exceed a meter in length.

Note, that the handedness(es) of the light in each SPV does not have to be the same, i.e. SPVs of mixed handednesses light can be used, but if one wishes to use total spectrum lenses to decode the SPVs for the individual eyes of the viewer, then each SPV must produce light of one handedness.

It appears that one of the techniques developed for the other CN-LC filter/mirror based displays has insurmountable difficulties when applied to the stereoscopic display device. The centiwave retarders on the inclined CN-LC filter/mirrors, can not make all the necessary corrections for both SPVs, since the same centiwave retarders would have to make the corrections to light coming from each LC switched array, which in most cases will not require the same correction. However, it is expected that very good displays are possible without this compensation.

TABLE I

| LOCATION | SPECIES OF LIGHT | | | |
|---|---|---|---|---|
| At light (1) | R(T), G(T), B(T) | | | |
| After filter L(r) (2) | R(r), G(T), B(T) | | | |
| After filter R(g) (3) | R(r), G(l), B(T) | | | |
| After filter L(b) (4) | R(r), G(l), B(r) | | | |
| State of Spatial Modulator (5) | "ON" (no effect) | | "OFF" (COH) | |
| After Spatial Modulator (5) | R(r), G(l), B(r) | | R(l), G(r), B(l) | |
| After filter R(b) (6) | R(r), G(l) | | R(l), G(r), B(l) | |
| After filter L(r) (7) | R(r), G(l) | | G(r), B(l) | |
| After filter R(g) (8) | R(r), G(l) | | B(l) | |
| State of Spatial Modulator (9) | "ON" (no effect) | "OFF" (COH) | "ON" (no effect) | "OFF" (COH) |
| After Spatial Modulator(9) | R(r), G(l) | R(l), G(r) | B(l) | B(r) |
| After RHCP filter (10) | R(r) | G(r) | 0/Black | B(r) |
| or | | | | |
| After LHCP filter (10) | G(l) | R(l) | B(l) | 0/Black |

ABBREVIATIONS:
FILTERS: first the handedness is specified by R or L, then the color in parentheses, as (r), (g), (b). The number in parentheses, identifies the feature in drawing FIG. 1.
LIGHT: first the color is specified by R, G, B, and then the handedness in parentheses, as (r), (l), with the "T" designation indicates total or unpolarized light, as R(T), G(T) or B(T).
STATE OF MODULATOR: "(COH)" indicates a Change of Handedness occurs to the CPL and "(no effect)" indicates that there is no change of handedness to the light traversing the cell of the modulator LCD.

TABLE II

| LOCATION | SPECIES OF LIGHT | |
|---|---|---|
| After Polarizer (10) | R(l), G(l), B(l) | |
| State of Spatial Modulator (9) | "ON" (no effect) | "OFF" (COH) |
| After Spatial Modulator (9) | R(l), G(l), B(l) | R(r), G(r), B(r) |
| After filter R(g) (8) | R(l), G(l), B(l) | R(r), B(r) |

TABLE II-continued

| LOCATION | SPECIES OF LIGHT | | | |
|---|---|---|---|---|
| After filter L(r) (7) | G(l), B(l) | | R(r), B(r) | |
| After filter R(b) (6) | G(l), B(l) | | R(r) | |
| State of Spatial Modulator (5) | "ON" (no effect) | "OFF" (COH) | "ON" (no effect) | "OFF" (COH) |
| After Spatial Modulator(5) | G(l), B(l) | G(r), B(r) | R(r) | R(l) |
| After filter L(b) (4) | G(l) | G(r), B(r) | R(r) | R(l) |
| After filter R(g) (3) | G(l) | B(r) | R(r) | R(l) |
| After filter L(r) (2) | G(l) | B(r) | R(r) | 0/Black |

ABBREVIATIONS:

FILTERS: first the handedness is specified by R or L, then the color in parentheses, as (r), (g), (b). The number in parentheses, identifies the feature in drawing FIG. 1.

LIGHT: first the color is specified by R, G, B, and then the handedness in parentheses, as (r), (l), with the "T" designation indicates total or unpolarized light, as R(T), G(T) or B(T).

STATE OF MODULATOR: "(COH)" indicates a Change of Handedness occurs to the CPL and "(no effect)" indicates that there is no change of handedness to the light traversing the modulator cell.

TABLE III

SECOND POLARIZATION MODULATOR CELL STATE

FIRST POLARIZATION MODULATOR CELL STATE

| | ON | 1/2 | OFF |
|---|---|---|---|
| ON | RED / GREEN | YELLOW / YELLOW | GREEN / RED |
| 1/2 | DIM RED / CYAN | WHITE / WHITE | CYAN / DIM RED |
| OFF | BLACK / BLUE | DIM BLUE / DIM BLUE | BLUE / BLACK |

↑ UPPER CASE RED HALFTONE COLUMN

↑ LOWER CASE RED HALFTONE COLUMN

← BLUE HALFTONE ROW (either case)

TABLE IV

SECOND POLARIZATION MODULATOR CELL STATE

FIRST POLARIZATION MODULATOR CELL STATE

| | ON | 1/2 | OFF |
|---|---|---|---|
| ON | GREEN | CYAN | BLUE |
| 1/2 | YELLOW | WHITE | DIM BLUE |
| OFF | RED | DIM RED | BLACK ← RED HALFTONE ROW |

↑ BLUE HALFTONE COLUMN

These and other embodiments can be practiced without departing from the true scope and spirit of the invention, which is defined by the following claims.

What is claimed is:

1. A stereoscopic display system comprised of an unpolarized light source, the light from said light source being divided into two substantially circularly polarized beams of light by a chiral nematic liquid crystal filter/mirror element, which reflects one handedness of circularly polarized light, while transmitting the opposite handedness of circularly polarized light for each specific color, and wherein said liquid crystal mirror is comprised of one or more filter/mirror layers, each layer reflecting and transmitting specific colors and handedness of circularly polarized light, so that the separate, reflected and transmitted beams of light can be of one or mixed handedness(es) of said circularly polarized light and said stereoscopic display is further comprised of means to direct said two substantially circularly polarized beams of light to separate polarization modulating liquid crystal variable retarder array devices, said variable retarder array devices filter and polarization modulate the two beams of light, encoding separate stereoscopic perspective views upon each beam of said circularly polarized light while preserving the opposite handedness of circularly polarized light between said two beams of light and converge said two beams of polarization modulated and encoded light upon a common set of chiral nematic liquid crystal filter/mirrors, which can produce the final intensity modulation of the polarization modulated two beams of substantially circularly polarized light, said final intensity modulation occurring through the reflection of unwanted components of said light of one beam and through transmission of the filter/mirror of the unwanted components of light from said second beam of light, whereas the desired components of light are similarly reflected and transmitted to form a common beam of substantially circularly polarized light, which is intensity and polarization encoded, so that if said common beam of polarized light is viewed directly or through projection onto a polarization preserving screen, by a viewer wearing polarization decoding glasses, wherein the lenses of said glasses transmit to each eye only the stereoscopic perspective view intended for that eye, the viewer will perceive a stereoscopic image.

2. A stereoscopic display system according to claim 1, wherein the substantially circularly polarized beams of light are directed to the liquid crystal variable retarder device and the final chiral nematic filter/mirrors by spectral reflectors.

3. A stereoscopic display system according to claim 1, wherein the substantially circularly polarized beams of light are directed to the liquid crystal variable retarder device and the final chiral nematic filter/mirrors by chiral nematic filter/mirrors.

4. A stereoscopic display system according to claim 1, wherein the substantially circularly polarized beams of light are directed to the liquid crystal variable retarder device and the final chiral nematic filter/mirrors by a combination of spectral reflectors and chiral nematic filter/mirrors.

5. A method of presenting a stereoscopic display to a viewer, comprising an unpolarized light source, the light from said light source being divided into two substantially circularly polarized beams of light by a chiral nematic liquid crystal filter/mirror element, which reflects one handedness of circularly polarized light, while transmitting the opposite handedness of circularly polarized light for each specific color, and wherein said liquid crystal mirror is comprised of one or more filter/mirror layers, each layer reflecting and transmitting specific colors and handedness of circularly polarized light, so that the separate, reflected and transmitted beams of light can be of one or mixed handedness(es) of said circularly polarized light and said stereoscopic display is further comprised of means to direct said two substantially circularly polarized beams of light to separate polarization modulating liquid crystal variable retarder array devices, said variable retarder array devices filter and polarization modulate the two beams of light, encoding separate stereoscopic perspective views upon each beam of said circularly polarized light while preserving the opposite handedness of circularly polarized light between said two beams of light and converge said two beams of polarization modulated and encoded light upon a common set of chiral nematic liquid crystal filter/mirrors, which can produce the final intensity modulation of the polarization modulated two beams of substantially circularly polarized light, said final intensity modulation occurring through the reflection of unwanted components of said light of one beam and through transmission of the filter/mirror of the unwanted components of light from said second beam of light, whereas the desired components of light are similarly reflected and transmitted to form a common beam of substantially circularly polarized light, which is intensity and polarization encoded, so that if said common beam of polarized light is viewed directly or through projection onto a polarization preserving screen, by a viewer wearing polarization decoding glasses, wherein the lenses of said glasses transmit to each eye only the stereoscopic perspective view intended for that eye, the viewer will perceive a stereoscopic image.

6. A color and polarization filter assembly comprising:

a first polarizing filter for transmitting light of first and second colors substantially only in a first polarization orientation and light of a third color substantially only in a second polarization orientation, which is substantially orthogonal to said first orientation, a second polarizing filter for transmitting light of said first and third colors substantially only in said second polarization orientation and light of said second color substantially only in said first polarization orientation, and first and second liquid crystal arrays each having multiple cells that are switchable individually between at least a first state and a second state for selectively modulating polarization orientation of polarized light passing through the individual cells of the array, and a specular polarizer, and wherein the second polarizing filter is disposed between the first polarizing filter and the specular polarizer, the first liquid crystal array is disposed between the first polarizing filter and the second polarizing filter, and the second liquid crystal array is disposed between the second polarizing filter and the specular polarizer.

7. A filter assembly according to claim 6, wherein the first and second liquid crystal arrays define an axis of the filter assembly and at least one of the polarizing filters is inclined relative to the axis of the filter assembly so as to direct light reflected from said one polarizing filter along a path that diverges from the axis of the filter assembly, and the filter assembly further comprises a light absorbing medium positioned to receive light reflected from said one polarizing filter.

8. A filter assembly according to claim 6, wherein in the first state of each cell of the first or second liquid crystal array, the cell does not alter polarization orientation of light passing through the cell in the first or second polarization orientation and in the second state of the cell, the cell alters polarization orientation of light received by the cell in said first polarization orientation or said second polarization orientation to said second polarization orientation or said first polarization orientation, respectively, and each cell has at least one intermediate state in which light received by the cell in either said first polarization orientation or said second polarization orientation is altered to a combination of said first and second polarization orientations.

9. A filter assembly according to claim 6, wherein in the first state of each cell of the first or second liquid crystal array, the cell imposes no optical retardation on light passing through the cell and in the second state of the cell, the cell imposes a half wave of optical retardation on light passing through the cell, and each cell has at least one intermediate state in which it imposes between zero and a half wave of optical retardation on light passing through the cell.

10. A filter assembly according to claim 6, further comprising a light source for producing substantially white light, and wherein the first polarizing filter is interposed between said light source and said first liquid crystal array.

11. A filter assembly according to claim 10, wherein at least the second polarizing filter comprises first, second and third color specific spectral filters, each of which reflects circularly polarized light of its specific color and of a first polarization orientation and transmits light of its specific color and of a second polarization orientation, which is orthogonal to said first orientation, and the filter assembly further comprises a birefringent wave plate positioned immediately upstream of at least one of said color specific spectral filters of the second polarizing filter and having its optical axis angularly positioned relative to the optical axis of the first liquid crystal variable retarder array for introducing a small amount of optical retardation to light modulated by the first liquid crystal variable retarder array and thereby rendering light of the specific color of said one spectral filter more nearly circular in polarization.

12. A filter assembly according to claim 6, further comprising a light source for producing substantially white light, and wherein the specular polarizer is interposed between said light source and the second liquid crystal array.

13. A filter assembly according to claim 12, wherein at least one of the polarizing filters comprises first, second and third color specific spectral filters, each of which reflects circularly polarized light of its specific color and of a first polarization orientation and transmits light of its specific color and of a second polarization orientation, which is orthogonal to said first orientation, and the filter assembly further comprises a birefringent wave plate positioned immediately upstream of at least one of said color specific spectral filters of said one polarizing filter and having its optical axis angularly positioned relative to the optical axis of the liquid crystal variable retarder array that is immediately upstream of said one polarizing filter for introducing a small amount of optical retardation to light modulated by the immediately upstream liquid crystal variable retarder array and thereby rendering light of the specific color of said one spectral filter more nearly circular in polarization.

14. A filter assembly according to claim 12 wherein the specular polarizer is a specular linear polarizer, in the first state, a cell of the second liquid crystal array does not alter polarization orientation of linearly polarized light transmitted thereby and in the second state the cell alters the polarization orientation of linearly polarized light transmitted thereby by the waveguide method of polarization modulation, and the filter assembly further comprises a quarter wave retarder oriented such that its optical axis is inclined at substantially 45° to the planes of polarization of linearly polarized light transmitted by the cell of the second liquid crystal array in the first and second states respectively, whereby the linearly polarized light passing through said cell is converted to substantially circularly polarized light of handedness that depends on whether the cell is in its first state or its second state.

15. A filter assembly according to claim 12, wherein the second polarizing filter comprises three spectral filters and at least one of the spectral filters is incorporated in glasses to be worn by a viewer.

16. A filter assembly according to claim 12, wherein each cell of at least one liquid crystal array can be switched to an on state and an off state and to intermediate states between the on state and the off state, whereby a single cell can produce a continuous variation of color.

17. A filter assembly according to claim 12, wherein the first and second liquid crystal arrays define an axis of the filter assembly and the first polarizing filter is inclined relative to the axis of the filter assembly so as to direct light reflected from the first polarizing filter along a path that diverges from the axis of the filter assembly, and the filter assembly further comprises a light absorbing medium positioned to receive light reflected from the first polarizing filter.

18. A filter assembly according to claim 17, wherein the first polarizing filter comprises three chiral nematic liquid crystal filter/mirrors.

19. A filter assembly according to claim 17, wherein the filter assembly comprises first and second light absorbing media, positioned for receiving light reflected from opposite respective sides of the first polarizing filter.

20. A filter assembly according to claim 6, wherein each of said first and second polarizing filters comprises first, second and third color specific spectral filters and each spectral filter removes from light entering the polarizing filter, light of one specific color and of one polarization orientation.

21. A filter assembly according to claim 20, wherein the spectral filters are incorporated on or within the liquid crystal arrays.

22. A filter assembly according to claim 6, wherein the specular polarizer is a specular circular polarizer, the liquid crystal arrays are liquid crystal variable retarder arrays, and the spectral filters are chiral nematic liquid crystal filter/mirrors.

23. A filter assembly according to claim 6, wherein the polarizing filters are incorporated on or in the liquid crystal arrays.

24. A filter assembly according to claim 6, wherein the specular polarizer is a multi-layer chiral nematic liquid crystal filter/mirror.

* * * * *